United States Patent [19]

Hoover et al.

[11] Patent Number: 4,589,508

[45] Date of Patent: May 20, 1986

[54] MOTORIZED WHEELBARROW

[76] Inventors: William A. Hoover; Fred E. Payne, both of 8791 Blue Jay La., Salt Lake City, Utah 84121

[21] Appl. No.: 658,115

[22] Filed: Oct. 5, 1984

[51] Int. Cl.$^4$ .............................................. B62D 51/04
[52] U.S. Cl. ..................................... 180/19.1; 180/13
[58] Field of Search ..................... 180/19.1, 19.2, 13, 180/19.3; 280/653; 172/256

[56] References Cited

U.S. PATENT DOCUMENTS

| | | | |
|---|---|---|---|
| 1,905,589 | 4/1933 | Hoffman et al. | |
| 2,535,615 | 12/1950 | Van Ausdall | 180/19.1 |
| 2,587,343 | 2/1952 | Lind | 192/0.096 |
| 2,649,162 | 8/1953 | Wooldridge et al. | 180/13 |
| 2,674,328 | 4/1954 | Searls | 180/26 |
| 2,722,841 | 11/1955 | Becker | 180/19.1 |
| 2,918,133 | 12/1959 | Ericsson | 180/19.1 |
| 3,021,625 | 2/1962 | Stasse | 37/130 |
| 3,891,043 | 6/1975 | Valdex | 180/19.1 |
| 4,144,945 | 3/1979 | Hamilton | 180/19.1 |

FOREIGN PATENT DOCUMENTS

| | | | |
|---|---|---|---|
| 106478 | 6/1963 | Denmark | 180/19.1 |
| 443770 | 5/1927 | Fed. Rep. of Germany | 180/19.1 |
| 989786 | 9/1951 | France | 180/19.1 |
| 671718 | 5/1952 | United Kingdom | 180/19.1 |
| 879558 | 10/1961 | United Kingdom | 180/19.1 |

Primary Examiner—Henry Bennett
Attorney, Agent, or Firm—Workman, Nydegger & Jensen

[57] ABSTRACT

A motorized wheelbarrow employing an engine to drive the wheel of the wheelbarrow. A unique friction drive transmission mechanism allows the wheelbarrow to be driven in either a forward or a reverse direction and can also stand in neutral while at the same time allowing the wheelbarrow to be accelerated gradually. In addition, a tire with a traction tread, can be used for the wheel so that the wheelbarrow has adequate traction in order to avoid becoming stuck in wet or rough terrain. The bed of the wheelbarrow is also capable of being pivoted upwardly in order to empty the bed without disrupting or upsetting the gasoline engine. The bed is easily removed so that various types of beds may be used interchangeably with the current invention. Those bed types include a flatbed, a bucket similar to that commonly used in the construction trades, and a stretcher-like bed which employs an additional set of handles on the front of the wheelbarrow.

38 Claims, 8 Drawing Figures

MOTORIZED WHEELBARROW

BACKGROUND

1. Field of Invention

The present invention relates to a wheelbarrow which is also equipped with an engine and a drive mechanism which are capable of propelling the wheelbarrow.

2. The Prior Art

The usefulness of various types of wheelbarrows and carts in allowing a man to transport a load are well known in the art. Single wheeled wheelbarrows have been found to be particularly useful in a variety of particular settings. Typically, while in use, the wheelbarrow's load is balanced over the wheel. As a result, the user of the wheelbarrow is not required to bear the weight of the entire load. The load, rather, is merely lifted until its weight pivots over the wheel sufficiently to place a substantial amount of the weight on the wheel. At this point the load can be pushed forward without the requirement of also lifting the entire load.

Single wheeled wheelbarrows are particularly useful in transporting a small but heavy load. The single wheel allows the load to be transported over a surface which is wide enough to accommodate the one wheel. As a result, on rough or soft terrain, a very narrow strip of passable surface is required. In the construction industry, for example, it is common to place a thin strip of lumber on soft or wet ground in order to roll wheelbarrows to a desired location. Problems, however, are encountered when an attempt is made to wheel a wheelbarrow over a surface which is not solid enough to support the weight of the load. In such a situation the wheelbarrow may become mired in mud or other material, and since the user is very often transporting loads which tax the limits of his strength, it is possible that the load will be upset and lost and injury may even result. In the alternative, it may take the efforts of several workmen together with ropes or pulleys to move the load.

Similar situations may be encountered in attempting to transport loads over rough terrain. While using a wheelbarrow in construction, gardening and other similar areas it is often necessary to cross terrain which is uneven or which is covered with debris of various types. Indeed the wheelbarrow is often particularly useful in moving loads across terrain which is virtually impassable by other larger particles such as between trees and through narrow gates. Again, however, if a user is pushing a heavy load and suddenly encounters an obstruction, such as a piece of construction debris, he may not have sufficient strength to push the load over or around the obstruction.

Several attempts have been made to solve the problems described above and to make the wheelbarrow easier to push by installing a source of locomotive power. Typically a gasoline engine has been mounted on the wheelbarrow in a manner which does not interfere with transporting a load. A drive means then is added which translates the power of the engine to the wheel of the wheelbarrow. The drive means used have typically been simple direct chain or belt drives which cause the wheelbarrow to be propelled forward when the engine is running.

Even though employing an engine allows the wheelbarrow to be more easily pushed forward under certain conditions, one major problem is that motorized wheelbarrows have generally only had a single forward gear. When the engine and drive train are engaged the wheelbarrow is thrust forward. One of the advantages of using a wheelbarrow, however, is its ability to be maneuvered in tight places which often requires the wheelbarrow to be pulled backward for a short distance before it can again move forward. Existing motorized wheelbarrows are of no help in performing such a maneuver and may even impede such a maneuver by the extra weight and bulk which has been added by the engine and drive train.

The addition of an engine to a wheelbarrow can defeat the balance which is achieved in conventional wheelbarrows. If the weight of the engine is placed too far to the rear, it may be difficult to lift the handles of the wheelbarrow sufficiently to balance the load, including the engine, over the front wheel. As a result, the user is forced to constantly lift the load putting a strain on various parts of his body, particularly his back.

The prior art has also identified the problem of motorized wheelbarrows stalling when the engine is engaged. Conventional clutch mechanisms have only been of minimal usefulness. When the conventional clutch is engaged the engine is immediately required to accelerate the heavy load along with the relatively heavy wheelbarrow. As a result, many times the engine stalls leaving the load stationary. It is difficult to ease the engine into gear and thus gradually accelerate the wheelbarrow.

Existing motorized wheelbarrows have also failed to deal adequately with the problem of becoming stuck in soft muddy ground and being stopped by obstacles in their path. Generally, motorized wheelbarrows are simply conventional wheelbarrows with minimal modifications. For example, the tire of a typical wheelbarrow is not a drive wheel and generally has a smooth tread. Motorized wheelbarrows have also used a similar tire. The result is that existing motorized wheelbarrows are very likely to become stuck when crossing soft ground because of the added weight of the drive mechanism and because of the lack of an adequate tread.

A further serious problem with existing motorized wheelbarrows is the problem of emptying the load. Until now it has been the practice to dump a motorized wheelbarrow in the same manner as a conventional wheelbarrow. That is, the handles of the wheelbarrow are lifted upwardly until the wheelbarrow pivots over the wheel sufficiently to cause the load to fall out of the front of the wheelbarrow. Alternatively, the wheelbarrow may be tipped to one side or another until the load falls out of the wheelbarrow.

The problems with emptying the wheelbarrow in the conventional manner are apparent. One problem is that the user is required to lift both the load and the engine in order to empty the wheelbarrow. This may be difficult, especially when the wheelbarrow contains a very heavy load. In addition, tilting a gasoline engine approximately 90 degrees is obviously undesirable. Gasoline may run out of the gas tank onto the hot engine causing serious safety problems and gasoline and oil may be allowed to flow into the carburetor causing the engine to flood or requiring the carburetor to be cleaned before further use. While certain motorized carts have included beds which pivot independently of the motor, the prior art does not diclose a motorized wheelbarrow where that is the case.

The result is that while it may be desirable to propel a wheelbarrow using an engine, no acceptable solution has been developed. Safety and related considerations may make it preferable that a workman have help in moving a heavy wheelbarrow over rough and wet terrain and up inclines, however, existing motorized wheelbarrows may simply add to the existing problems. The problems discussed above related to the direct drive of the device make this type of device difficult to use and maneuver. In addition, the fact that existing devices have no reverse gear further limits their usefulness. It is often desirable to backup a wheelbarrow a short distance in order to maneuver it around a corner or through a tight space. The lack of a reverse gear severely limits this capability. When these problems are added to the problem of emptying the wheelbarrow when the bed of the wheelbarrow is rigidly mounted to the frame, it is clear that improvements in the art are needed.

It is apparent that what is needed in the art is a motorized wheelbarrow which largely overcomes the problems presently encountered. It would be an advancement in the art to provide a motorized wheelbarrow with both a forward and a reverse gear and with a clutch mechanism which will allow the loaded wheelbarrow to begin moving gradually without causing the engine to stall. It would also be an advancement in the art if such a device could be emptied without tipping the entire wheelbarrow including the engine. It would also be an advancement in the art if such a wheelbarrow were well balanced and maneuverable and was not likely to become mired when crossing mud or other soft surfaces. Such a device is disclosed and claimed below.

BRIEF SUMMARY AND OBJECTS OF THE INVENTION

The present invention is a novel and unique wheelbarrow which is also equipped with an engine and a friction drive transmission mechanism. The wheelbarrow is particularly useful in carrying small, heavy loads over rough or wet terrain and up inclines.

The wheelbarrow portion of the present invention is at first glance similar to a conventional wheelbarrow. The wheelbarrow has a conventional bed or receptacle, a flatbed, or any other type of bed into which material can be loaded. The bed is mounted onto a frame, the front of which is attached to the axle of the wheelbarrow's wheel. Instead of employing the type of tread typically used in wheelbarrows, however, it is desirable that the wheel have a traction tread design such as that used in offroad vehicles. The rear of the frame is attached to a pair of legs which, when taken in combination with the wheel, support the wheelbarrow while it is in a resting position. Extending from the rear of the wheelbarrow are a pair of handles.

While the general appearance of the wheelbarrow is similar to that of conventional wheelbarrows, several aspects of the present invention make it unique. The wheelbarrow incorporates a small but relatively powerful gasoline engine. This engine in turn is used to move the wheelbarrow in both a forward and a reverse direction through the use of a friction drive transmission mechanism. The friction drive transmission mechanism allows the device to be accelerated gradually and without causing the engine to stall. The operation of the wheelbarrow is controlled by hand operated transmission and throttle controls conveniently located on the handles of the wheelbarrow. The wheelbarrow is then driven by a tire having a traction tread which does not tend to become stuck in rough or wet terrain.

In order to provide for ease in lifting the wheelbarrow, the bed is mounted further forward such that when loaded, the weight of the bed will tend to counterbalance the weight of the engine. This provides the wheelbarrow with a distribution of weight which make it easy to handle. No part of the engine or transmission extends beyond the frame, making the wheelbarrow very maneuverable and preventing the possibility of collisions between the engine and outside objects. In addition, the engine is protected by the configuration of the wheelbarrow frame and its location with respect to the bed. One or more mud flaps may also be added in order to prevent dirt and debris from striking the engine.

An additional unique feature of the wheelbarrow is the ability to easily change beds. Such beds could include the conventional bucket type bed, a flat bed which is particularly adaptable for carrying items with regular rectangular shapes such as bricks, sheet rock, sod and lumber or an extended bed having two sets of handles which bed is adaptable for use as a stretcher or for carrying large bulky loads. Numerous other bed configurations are of course possible. Thus, a single wheelbarrow can perform the functions which would require several complete wheelbarrows of the conventional type.

The wheelbarrow also includes a unique mechanism for emptying its contents. The wheelbarrow frame contains a hinge and lock mechanism which allows the user to lift the wheelbarrow's bed without tilting the basic frame and the engine when it is desired to unload the bed, the lock is simply released and the bed is pivoted over the front wheel until the load is emptied. This avoids the problem of fuel and oil flowing out of the engine or flooding the carburetor and also allows the user more control over the emptying of the bed. As an additional benefit to the user, the wheelbarrow bed may be lifted by a dumping bar which allows the load to be pivoted by the user employing his larger, and consequently stronger, muscle groups.

It is, therefore, an object of the present invention to provide a motorized wheelbarrow which is easy to lift, maneuver and empty.

A further object of the invention is to provide a motorized wheelbarrow which includes a friction drive transmission mechanism which has a reverse as well as a forward gear and which can be accelerated gradually and has a neutral gear which allows the wheelbarrow to "free wheel" when the mechanism is not engaged.

Another object of the invention is to provide a motorized wheelbarrow which is capable of being unloaded by the use of a mechanism which tilts the bed of the wheelbarrow without tilting the engine or transmission and which can be easily controlled by the user.

Still another object of the present invention is to provide a wheelbarrow on which the beds can be easily replaced and which can accommodate a flatbed, a bucket-like bed, a stretcher-like bed, and other bed attachments.

These and other objects of the invention will become apparent upon reading the following detailed description and appended claims, and upon reference to the accompanying drawings.

DETAILED DESCRIPTION OF THE PREFERRED EMBODIMENTS

Figure 1:
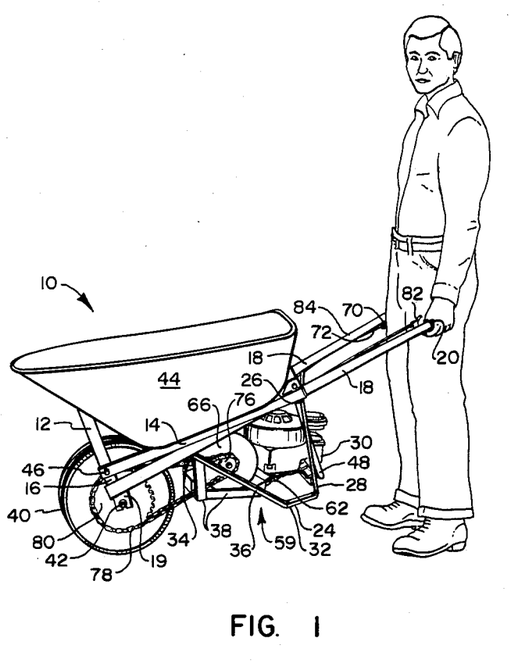
FIG. 1 is a perspective view of the device of the present invention showing its method of operation by a user.

The present invention can be best understood by reference to the drawings wherein like parts are designated with like numerals throughout. Referring more particularly to FIG. 1, a first preferred embodiment within the scope of the present invention is illustrated. The present invention is a motorized wheelbarrow and is generally designated 10. The motorized wheelbarrow includes several unique features which make the wheelbarrow 10 particularly useful within the construction trades, for farming, gardening and ranching, and for other heavy uses.

Figure 2:
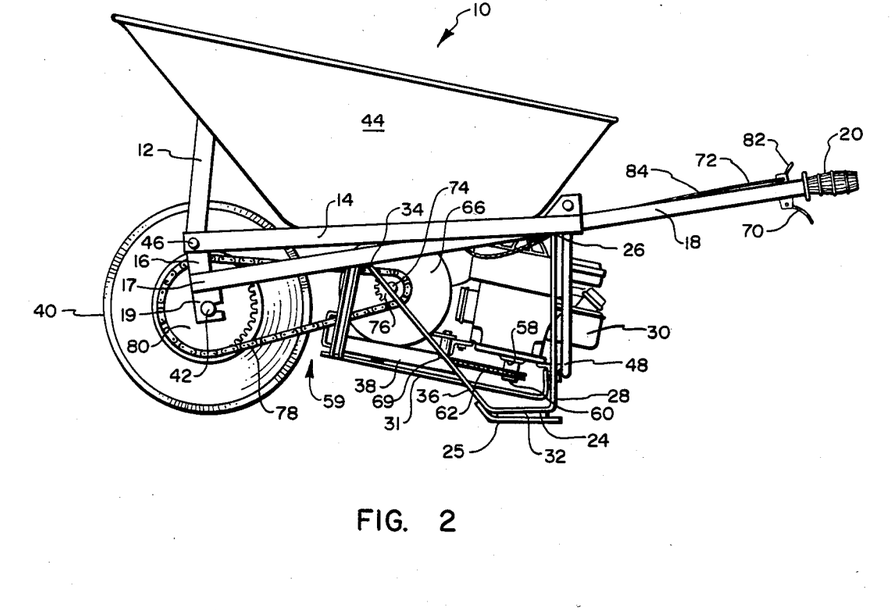
FIG. 2 is a side elevational view of the device of the present invention showing a leg extender and a skid plate.

The basic wheelbarrow 10 has many of the same features as a conventional wheelbarrow. The frame of the wheelbarrow 10 is expected to be constructed of heavy duty, welded steel and tube, strips or angle pieces. As illustrated in FIGS. 1 and 2, the basic wheelbarrow is expected to include vertical and horizontal supports designated 12 and 14 respectively. Extending generally downwardly from the intersection of the generally vertical supports 12 and the generally horizontal supports 14 are hinge posts 16. Hinge posts 16 are constructed of the same or similar material as is the remainder of the frame. One hinge post 16 will be expected to be mounted on each side of wheel 40.

Affixed to hinge post 16 at junction 17 are handles 18. Handles 18 extend from just above junction 17 past the rear of the wheelbarrow bed or bucket 44 sufficiently to allow handles 18 to be easily grasped and to allow room for a user to comfortably walk behind the wheelbarrow 10. It is expected that the ends of handles 18 will be covered by rubber or plastic grips 20. Grips 20 will, of course, allow handles 18 to be easily grasped by a user such that the handle 18 feels comfortable in the hand of the user and so that a secure grip may be maintained even when operating the hand controls. Handle 18 and grips 20 may also be angled down slightly so that the grips 20 will be better aligned with the user's hand and forearm.

Figure 3:
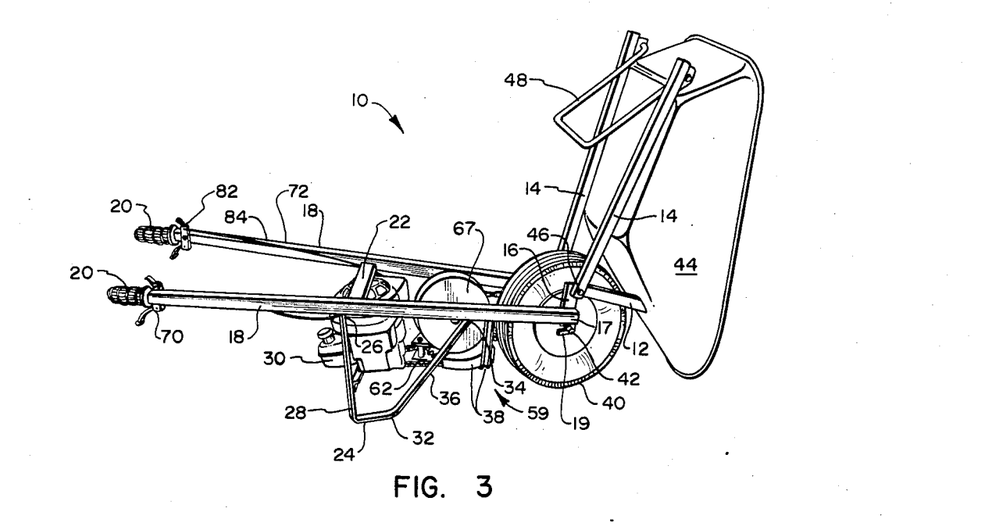
FIG. 3 is a perspective view of the device of the present invention showing the bed tilted upward into a dumping position.

As is best illustrated in FIG. 3, the wheelbarrow frame may also include a brace 22 which extends between the two handles 18. Brace 22 will aid in supporting the various parts of the frame and will assure that both handles 18 are kept in the proper position with relation to one another. Brace 22 also has sufficient width to help prevent dirt and debris from coming into contact with engine 30. As additional methods of keeping dirt and debris away from the engine and transmission, removable mud flaps (not shown) may be attached to the brace 22 and extend rearwardly over the engine 30, or a removable canopy (not shown) may be disposed between the handles 18 and extending from the brace 22 towards the wheel 40.

Extending downwardly from handles 18 are legs 24. Legs 24 can take any shape desired. However, the general shape as illustrated in FIG. 2 has been found to be satisfactory. Legs 24 are affixed to handles 18 at junctions 26 and 34. Legs 24 extend downwardly from junction 26 as desired. As best illustrated in FIG. 2, the length of vertical segment 28 of leg 24 will be chosen so that the wheelbarrow bed will rest in a generally horizontal position while not in use or while it is being loaded. Vertical segment 28 will also be long enough to assure that the engine 30 will remain a safe distance off the ground.

In certain situations, it may be desirable to extend the effective vertical length of leg 24. It may be useful to extend leg 24 in order to make the wheelbarrow 10 more easily manageable by tall individuals, in order to allow the bed 44 to rest at a slightly different angle or to prevent the wheelbarrow 10 from sinking into soft ground. To accomplish these aims leg extenders 25, as shown in FIG. 2, may be attached to leg 24 as illustrated.

Legs 24 may also have a horizontal segment 32. Again numerous sizes and configurations of horizontal segment 32 are possible and may be desired in certain situations, however, one acceptable configuration is that illustrated in FIG. 2. Horizontal segment 32 provides wheelbarrow 10 with stability while resting on the ground when leg extenders 25 are not being used. Portions of the legs 24, namely angular segments 36, then extend at an angle back to junctions 34 with handles 18. Again the length of angular segment 36 is chosen in order to provide maximum stability for the wheelbarrow while it is at rest. The general configuration of legs 24 including each of their segments is also chosen in order to protect engine 30 and the drive train. Leg 24 keeps foreign objects away from the engine 30 and prevents direct collisions between foreign objects and engine 30 as well as providing mounting points for the various mounting brackets 38 and other parts of the drive train 59. The final elements of the wheelbarrow frame are various mounting brackets 38 for the engine 30 and its associated drive train. Mounting brackets 38 are expected to be made of the same or similar material as the remainder of the frame. Brackets 38 are expected to be attached to the legs 24 and the handles 18 and will be configured in order to allow the desired engine 30 to be secured to the remainder of the wheelbarrow 10.

As with a conventional wheelbarrow, a wheel 40 will be mounted to the front of the wheelbarrow 10 in such a manner as to support the weight of the wheelbarrow when handles 18 are lifted. Wheel 40 will be attached to an axle bracket 19, which in turn is connected to hinge posts 16. One method of attaching wheel 40, as illustrated in FIG. 2, employs a nut 42 which attaches the wheel's axle (not shown) to the axle bracket 19.

Another element of the basic wheelbarrow 10 is the bed which is used to hold the load to be transported.

One type of bed is the bucket 44 illustrated in FIGS. 1 through 3. The bucket 44 illustrated is constructed of stamped steel and has a typical size of approximately 5¼ cubic feet. Bucket 44 is similar to that commonly in use in the construction industry and is particularly adaptable for carrying various types of loads, including liquid or semi-liquid loads such as wet concrete or mortar.

Bucket 44 is securely mounted to vertical supports 12 and horizontal supports 14. Indeed, it may be desirable to weld the supports 12 and 14 to the bucket 44 in order to adequately secure bucket 44 in place. Bucket 44, together with vertical supports 12 and horizontal supports 14, are attached to the frame of the wheelbarrow by bolts 46. Bolts 46 pass through a hole located near the junction between vertical support 12 and horizontal support 14 and secure the supports 12 and 14 to hinge posts 16. The bed rests further forward on the frame than does a typical conventional bed, thus allowing the load to help counterbalance the weight of the engine 30.

It is currently preferred that the connection between supports 12 and 14 and hinge posts 16 be such that the bucket 44 will be allowed to pivot with respect to the remainder of the wheelbarrow 10. FIG. 3 illustrates bucket 44 after it has been fully pivoted around bolt 46. It should be noted that the bucket 44 does not break against wheel 40 as it is emptied. The ability to pivot the bed of the wheelbarrow 10 facilitates greatly the ability to empty the wheelbarrow's load. This feature also allows the wheelbarrow 10 to be emptied without upsetting the engine 30 or requiring that a user lift the engine 30. While being loaded or while transporting a load, horizontal support 14 will simply rest against handle 18 as illustrated in FIG. 2 and the bucket 44 will be secured to the frame by a latch (not shown). When it is desired to empty the bucket 44, a user simply opens the latch and lifts up on a dump bar 48 which is attached to horizontal supports 14.

Dump bar 48 is designed so that it can be easily lifted without requiring the user to stoop over while lifting and without putting undue pressure on the user's back. The user can swing the dump bar 48 to an easy and comfortable lifting position without engaging the wheelbarrow's 10 load. Once the user has the dump bar 48 at such a position he can then lift and pivot the load by continuing to lift dump bar 48. The entire lifting operation can be done by employing only the user's larger and stronger muscle groups and while in a comfortable stance, thus avoiding strain and fatigue. As the dump bar 48 is lifted the bucket 44 begins to pivot over the front wheel. Dump bar 48 is ultimately lifted until the load begins to leave bucket 44. At this point the pivoting feature together with dump bar 48 allows a user much more control in emptying the load than is available in conventional wheelbarrows. The entire procedure can be accomplished without requiring the user to change grips or to lose control of the load.

An additional advantage of the present invention is the ability to replace the bucket 44 with a different type of bed. This can be done by simply removing bolts 46 and then lifting supports 12 and 14, together with the bucket 44, off the frame of the wheelbarrow. At that point a larger or smaller bucket-like bed or a bed of another configuration may be attached. For example, a flatbed configuration is shown in FIG. 6 and the stretcher configuration is shown in FIG. 8.

Figure 6:
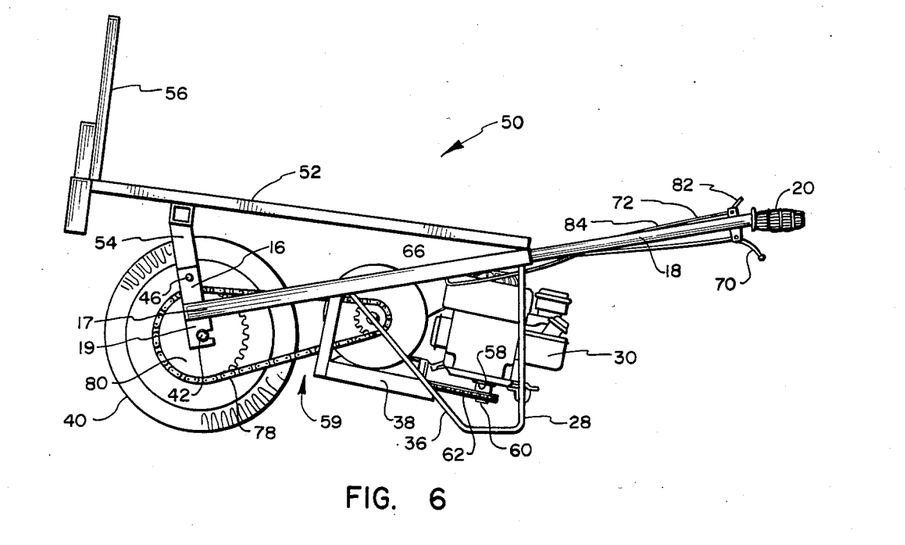
FIG. 6 is a side elevational view of the device of the present invention illustrating the flatbed embodiment.

The wheelbarrow 50 shown in FIG. 6 is identical, in most respects, to the wheelbarrow 10 shown in FIGS. 1 through 3, with the exception of the different bed 52 and the configuration of the support members used to support bed 52. Flatbed 52 is essentially supported by generally vertical supports 54 and handles 18. Flatbed 52 can be constructed in any acceptable manner and could use wood, metal or other materials. One acceptable manner of construction employs a welded steel tube and angle frame onto which a sheet of ¾ inch plywood is mounted. The embodiment of the flatbed 52 illustrated in FIG. 6 includes a removable backstop 56, though a permanent backstop 56 can be used. Backstop 56 gives additional stability to items loaded on flatbed 52. In order to attach the flatbed 52 a generally square support 54 is slipped onto and over hinge post 16. Bolt 46 then is re-inserted to hold flatbed 52 securely in place.

It is apparent that flatbed 52 is particularly useful in carrying a load of regularly sized items. These could include items such as bricks, concrete blocks and lumber. In addition, flatbed 52 is useful in carrying heavy solid objects such as stone, sod, plants and bags where the sides of the wheelbarrow provide very little support and may indeed obstruct the loading and unloading of the object.

Figure 8:
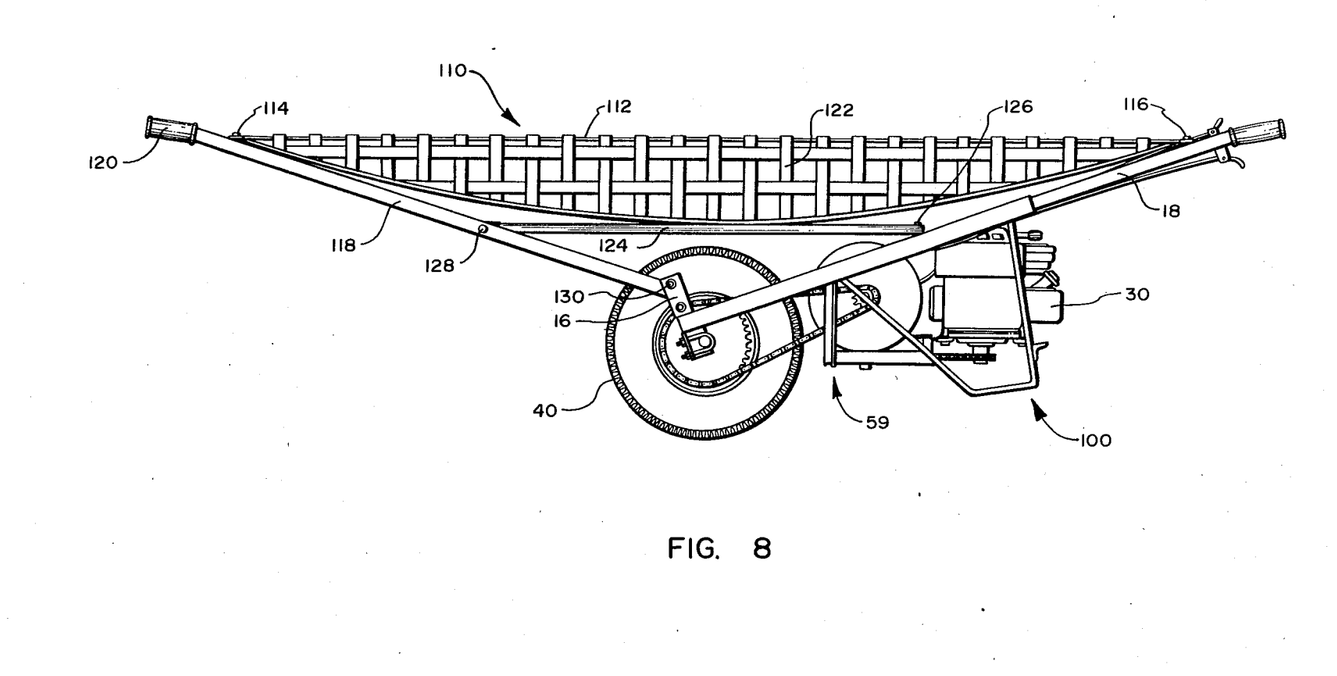
FIG. 8 is a side elevational view of the device of the present invention illustrating an emobodiment employing a stretcher-like bed and two sets of handles.

FIG. 8 illustrates an additional embodiment of the current invention which also broadens its possible scope of use. Again, the wheelbarrow 100 is identical in most respects to the wheelbarrow 10 shown in FIGS. 1 through 3, with the exception of the configuration of the bed. The engine 30, drive train 59 and other basic features of the invention are the same in the embodiment illustrated in FIG. 8 and in the other illustrated embodiments. Added to this embodiment, however, is an elongated stretcher bed, generally designated 110. The stretcher bed 110 includes an additional set of handles 118 which extend forward on the opposite side of wheel 40 from handles 18. The handles 118 are provided with grips 120 which are similar to the grips 20 which are attached to handles 18.

The stretcher bed 110 has as another important element a cable, such as a ¼ inch wire rope 112, which extends from a point of attachment 114 on the handles 118 to a point of attachment 116 on the handles 18. The wire rope 112 can be attached to the handles 18 and 118 in any conventional manner which assures that the wire rope 112 will be held securely in place. Wire rope 112 acts as a means for supporting a sling 120. The sling 120, in turn, can be constructed of any material having the desired properties of strength and flexibility, however, one acceptable material has been found to be nylon webbing which is one inch wide. The webbing is then loosely woven and attached to the wire rope 112, in the manner illustrated in FIG. 8, to form the sling 122.

Another feature of the stretcher bed 110 illustrated in FIG. 8 is a cargo platform 124. The cargo platform 124 may form a support for heavy loads carried within the stretcher 110. In one preferred embodiment of the wheelbarrow 100, the platform 124 is constructed of ¾ inch plywood with dimensions of approximately 37 inches by 16 inches and may also rest in a steel frame. The platform 124 is attached to the handles 18 and 118 at points of attachment 126 and 128 respectively. It is expected that the platform 124 will be removably attached to the handles 18 at the point of attachment 126, but may be securely and possibly pivotably attached to the handles 118 at the point of attachement 128.

The wheelbarrow 100 with the stretcher bed 110 attachment is designed for use by two individuals. The handles 118, like the handles 18, are particularly configured to allow ease and comfort in use. As will be readily appreciated, the wheelbarrow 100 is particularly useful in transporting cargo which could not ordinarily be transported by a wheelbarrow because of its size or shape. Cargos such as large game animals, bulky construction materials or those having an irregular shape such as large rolls of insulation, or even injured people can easily be transported using the wheelbarrow 100 illustrated in FIG. 8.

Figure 7:
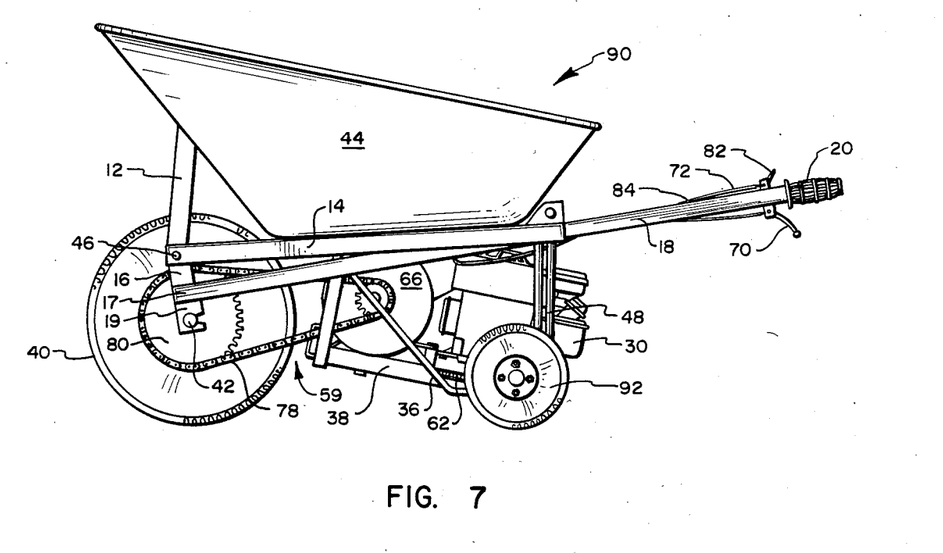
FIG. 7 is a side elevational view of an alternative embodiment of the device of the present invention, said device having a set of three wheels.

An additional embodiment of the wheelbarrow is illustrated in FIG. 7. The wheelbarrow 90 shown in FIG. 7 is identical in all respects to the wheelbarrow 10 shown in FIGS. 1, 2 and 3, except for the addition of rear wheels 92. In certain situations, such as when it is desirable to carry extremely heavy loads over relatively smooth terrain it may be desirable to attach wheels 92. Wheels 92 will allow a heavy load to be moved without requiring the user to lift the heavy load, along with the wheelbarrow and its attachments.

Added to the wheelbarrow in its various embodiments is a small engine 30. Engine 30 may be a gasoline engine or any other type of acceptable engine. Any small but powerful gasoline engine would be acceptable for use in connection with the present invention. One engine which has been found to be acceptable is a four horsepower engine manufactured by Briggs and Stratton. That engine includes a heavy flywheel, a recycling rope starter, an automatic choke and runs at about 3200—3400 rpm and includes a governor. As discussed above, engine 30 is attached to mounting brackets 38 in any accetable manner which holds the engine 30 securely in place but does not interfere with the operation of the engine 30.

Where it is desirable to provide additional protection for engine 30, it is possible to add a skid plate 31 as shown in FIG. 2. Skid plate 31 will prevent foreign objects from striking engine 30 from beneath. Skid plate 31 may be attached to the wheelbarrow 10 in any manner which allows it to be put in place without interfering with the operation of engine 30 or any other aspect of wheelbarrow 10.

One of the unique features of the present invention is the design and operation of the friction transmission mechanism, generally designated 59. The friction transmission mechanism 59 allows the wheelbarrow 10 to be powered in either a forward or a reverse direction and also, of course, includes a neutral position. In addition, the design of the friction drive mechanism employed in connection with the friction drive transmission mechanism 59 allows the device to be eased into gear. This allows the wheelbarrow 10 to be accelerated gradually and also avoids causing the engine 30 to stall when put into gear.

Figure 4:
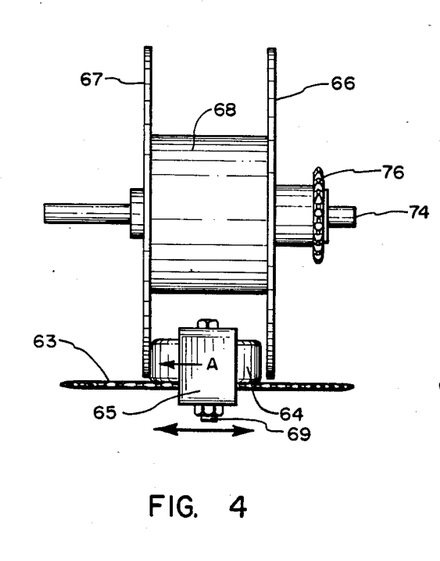
FIG. 4 is a front elevational view of the transmission mechanism of the present invention as viewed from the front wheel.
Figure 5:
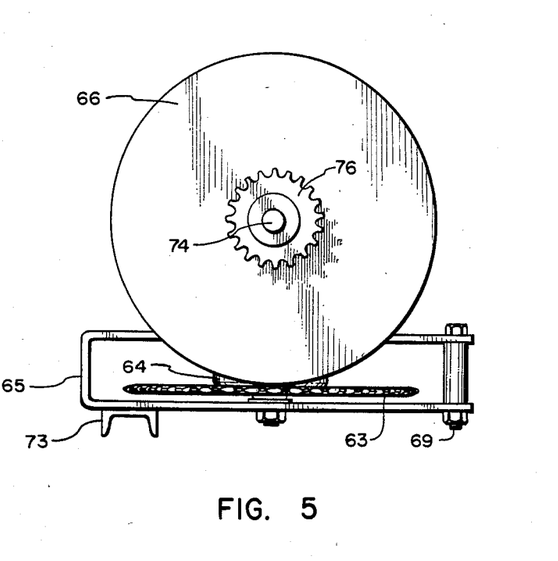
FIG. 5 is a side elevational view of the transmission mechanism of the present invention.

As illustrated in FIG. 2, the vertical driveshaft 58 exits the bottom of the engine 30. Attached to the base of driveshaft 58 is a chain drive sprocket 60. The chain drive sprocket 60 in turn moves a first continuous link chain 62. This first chain 62 moves in a generally horizontal plane in the illustrated embodiments of the device. First chain 62 in turn is in communication with and causes to rotate a friction wheel 64, as illustrated in FIG. 4, through a second chain drive sprocket 63 as shown in FIGS. 4 and 5. Friction wheel 64, which is expected to be made of hard rubber or a similar substance, rotates continuously as long as engine 30 is running and is mounted on a swing arm or bracket 65. Bracket 65, in turn, pivots on pivot pin 69 at one end and slides along a support member 73 (shown at FIG. 5) at the other end.

Again as illustrated in FIG. 4, friction wheel 64 continuously rotates between a pair of drive plates 66 and 67. Drive plates 66 and 67 are attached to an intermediate cylinder 68 whose function is simply to space and securely attach both drive plates 66 and 67 so that they both move in the same direction at the same time. Friction wheel 64 is mounted on swing arm 65 which pivots on pivot pin 69. Swing arm 65 is controlled by a friction drive lever 70 mounted on handle 18. Friction drive lever 70 is attached in turn to a friction drive cable 72 which runs from the friction drive lever 70 to the swing arm 65. Depending on the manner in which the friction drive cable 72 is installed, pulling on the friction drive lever 70 from the bottom will cause the swing arm 65 and the friction wheel 64 to move to the right (as seen from the operator's position) and pulling on the friction drive lever from the top will cause the friction wheel 64 to move to the left. FIG. 5 is simply a side elevational view of the friction drive mechanism illustrated in more detail in FIG. 4.

Referring again to FIG. 4, for purposes of discussion it may be assumed that, when viewed from the operator's position friction wheel 64 is turning in a clockwise direction in a generally horizontal plane as illustrated by arrow A. If the bracket 65 and friction wheel 64 are moved to the right it will begin to engage the bottom portion of the right drive plate 66. The clockwise turning of friction wheel 64 will begin to move the right drive plate 66 in a clockwise direction in a generally vertical plane. Conversely, if bracket 65 and friction wheel 64 is moved to the left to engage left drive plate 67, left drive plate 67 will move in a counterclockwise direction. Essentially, in whatever direction friction wheel 64 is moving, engaging the bottom portion of right drive plate 66 will cause the entire friction drive mechanism (comprising both drive plates 66 and 67 and intermediate cylinder 68) to move in a clockwise direction, while engaging the left drive plate 67 will cause the friction drive mechanism to move in a counterclockwise direction. When the friction wheel 64 is between both drive plates 66 and 67, the drive mechanism will, of course, not move. The significance of the ability to move the friction drive mechanism in both directions (as illustrated by double arrow B of FIG. 4), as will be more fully discussed below, is that the device is provided with both a forward and a reverse gear. In addition, while the friction wheel 64 is not engaging either drive plate 66 or 67, the device is in neutral.

The operation of the friction drive mechanism, by having the friction wheel 64 engage the drive plates 66 and 67, allows the wheelbarrow to begin moving slowly and gradually. The device is not forced suddenly into gear and thus the potential for spilling the wheelbarrow's load or causing accidents is markedly reduced.

The friction drive mechanism is mounted onto the legs of the device as illustrated in FIG. 2. This may be done in any conventional manner which will allow the drive plates 66 and 67 to freely turn when engaged by friction wheel 64. One acceptable method of mounting would be to provide mounts on the angular segment 36 of leg 24, for an axle 74 which extends through the interior of the friction drive mechanism.

Mounted on the axle 74, spaced from the drive plates 66 or 67, will be a chain or belt drive 76. Again, for purposes of illustration, a chain drive 76 is shown in FIGS. 2, 4 and 5. A second continuous link chain 78 engages chain drive 76 and extends to a sprocket wheel 80 which is securely mounted onto the side of the wheelbarrow's wheel 40. This causes the wheel 40 to rotate in the same direction as the drive plates 66 and 67 thus driving the wheelbarrow 10 in either a forward or a reverse direction.

In summary, the friction transmission mechanism 59 of the invention begins with driveshaft 58 which extends vertically out of engine 30. The driveshaft 58 turns a chain drive sprocket 60 which is mounted onto driveshaft 58. The chain drive sprocket 60 engages a first chain 62 which in turn rotates second chain drive sprocket 63 attached to friction wheel 64. Depending on the position of friction wheel 64, as controlled by friction drive lever 70 and a friction drive cable 72, friction wheel 64 may engage either the left drive plate 67, the right drive plate 66 or neither drive plate. The drive plates 66 or 67 will in turn move a second chain 78 by turning a chain drive 76 mounted on the axle 74. The second chain 78 then rotates a sprocket wheel 80 mounted on the wheel 40. This propels the wheelbarrow 10 in the desired direction.

By employing the friction transmission mechanism of the current invention, the wheel 40 may be turned in a forward or reverse direction or may stand at rest. As shown in FIG. 2, if the drive plates 66 and 67 rotate in a counterclockwise direction the wheelbarrow 10 will move forward. Conversely, if the drive plates 66 and 67 rotate in a clockwise direction the wheelbarrow 10 will be propelled backward. The speed of the wheelbarrow 10 can be easily controlled by throttle lever 82 which may be mounted on the handle 18 of the wheelbarrow 10. The throttle lever 82 is in turn in communication with the throttle of the engine 30 through a throttle cable 84. As a result, a user can easily cause the wheelbarrow 10 to be propelled forward or backward and can conveniently control the speed of the wheelbarrow 10.

The advantages of the present invention are clear. The friction transmission mechanism of the present invention allows the engine to be slowly and gradually engaged. This allows the wheelbarrow 10 to be accelerated slowly in order to avoid disrupting the load and creating a serious safety hazard. The slow acceleration also avoids the problem of stalling the engine as the friction drive mechanism is engaged, particularly while the wheelbarrow 10 is carrying a heavy load. In addition, the friction transmission mechanism provides for propulsion in both a forward and a reverse direction. This greatly increases the maneuverability of the wheelbarrow 10 since wheelbarrows often must be backed up in order to negotiate tight corners and to steer through narrow passageways. The neutral position also aids in the use of the wheelbarrow 10. The friction transmission mechanism may be fully disengaged allowing the wheelbarrow 10 to be pushed manually without encountering significant resistance through the drive train 59 or engine 30.

An additional advantage of the present invention is the ability to pivot the bed of the wheelbarrow 10 without disturbing the engine 30. If the engine were required to be pivoted along with the bed, fuel or oil could spill out of the engine or flow into the carburetor, either of which would cause safety problems and inconvenience. In addition, it may be difficult for a user to lift both a heavy load and the entire wheelbarrow without losing control of the load. A further related advantage of the present invention is the ability to easily change beds. Various types of beds may be suitable for various specific situations and the ability to change beds greatly increases the economy and flexibility of the present invention.

It will be appreciated that the apparatus and method of the present invention are capable of being incorporated in the form of a variety of embodiments, only a few of which have been illustrated and described above. The invention may be embodied in other specific forms without departing from this spirit or its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A motorized wheelbarrow comprising:
   a frame comprised of a pair of handles, each handle having a leg securely attached thereto positioned so as to aid in supporting said wheelbarrow, means for maintaining said handles securely in place with respect to one another, mounting means attached to said handles and said legs for holding an engine;
   a wheel mounted on said frame by connecting means such that said wheel is in position to bear the load of the frame and its cargo when the handles are lifted;
   an engine mounted on said frame;
   a friction drive transmission mechanism mounted on said frame such that power produced by said engine is capable of being transmitted to said wheel, said transmission mechanism comprising a friction wheel disposed between a pair of drive plates, said drive plates being in power transmission communication with said wheel, and means for causing said friction wheel to selectively engage one of said drive plates or rest between said drive plates such that the wheelbarrow will be driven selectively in the forward or reverse direction or may rest in neutral; and
   a bed pivotably attached to said frame and capable of carrying a load.

2. A wheelbarrow as defined in claim 1 wherein said bed is pivotably attached to said frame by a pair of bolts which pivotably connect to support members attached to said bed.

3. A wheelbarrow as defined in claim 2 wherein said support members and said bed have the capability to pivot upwardly around said bolts and away from said frame.

4. A wheelbarrow as defined in claim 2 wherein said bed is removable from said frame by removing said bolts and lifting said bed from said frame.

5. A wheelbarrow as defined in claim 1 wherein said bed comprises a bucket.

6. A wheelbarrow as defined in claim 1 wherein said bed is generally flat.

7. A wheelbarrow as defined in claim 1 wherein said bed comprises a stretcher and an additional pair of handles extending in a forward direction with respect to said wheel.

8. A wheelbarrow as defined in claim 1 further comprising a dumping bar attached to said bed at the end distant from the pivot point for said bed.

9. A wheelbarrow as defined in claim 8 wherein said dumping bar is swingably attached to said bed.

10. A wheelbarrow as defined in claim 1 wherein said wheel further comprises a tire having a traction tread.

11. A wheelbarrow as defined in claim 1 wherein a support wheel is mounted to each leg such that said wheelbarrow is supported by three wheels.

12. A wheelbarrow as defined in claim 1 wherein said means for maintaining said handles securely in place with respect to one another comprises a brace which also shields said engine from debris.

13. A motorized wheelbarrow for carrying cargo comprising:
   a frame comprised of a pair of handles, each handle having a leg securely attached thereto, positioned so as to aid in supporting said wheelbarrow, means for maintaining said handles securely in place with respect to one another, mounting means attached to said handles and said legs for holding an engine and a friction transmission mechanism;
   at least one wheel mounted on said frame by connecting means such that said at least one wheel is in position to bear the load of the frame and the cargo when the handles are lifted;
   an engine mounted on said frame;
   a friction drive mechanism having a control means comprising a friction wheel in power transmission communication with said engine and mounted such that it is disposed between a pair of spaced drive plates in power transmission communication with said at least one wheel, wherein said control means for operating said friction drive mechanism communicates with said friction wheel to cause selective lateral movement of said friction wheel such that it engages and turns either drive plate thereby causing the rotation of the drive plates to be transmitted to said wheel such that the friction drive mechanism is capable of moving said at least one wheel in both forward and reverse directions and also allowing said wheelbarrow to rest in neutral; and
   a bed capable of carrying cargo attached to said frame.

14. A wheelbarrow as defined in claim 11 wherein said bed is generally flat.

15. A wheelbarrow as defined in claim 12 wherein said bed further comprises a backstop attached to the end of said bed proximate to the wheel; said backstop for stabilizing the cargo during movement of the wheelbarrow.

16. A wheelbarrow as defined in claim 13 wherein said bed comprises a stretcher and an additional pair of handles extending in a forward direction with respect to at least one wheel.

17. A wheelbarrow as defined in claim 13 wherein said friction transmission further comprises a drive shaft turned by said engine, a first means for placing said drive shaft in communication with said friction drive mechanism and a second means for placing said friction drive mechanism in communication with and turning at least one wheel.

18. A wheelbarrow as defined in claim 17 wherein said first means for placing said drive shaft in communication with said friction drive mechanism comprises a first chain drive sprocket attached to said drive shaft, a second chain drive sprocket attached to said friction drive mechanism and a first continuous link chain mounted on said first and second chain drive sprockets.

19. A wheelbarrow as defined in claim 17 wherein said second means for placing said friction drive mechanism in communication with and driving said wheel comprises a sprocket wheel securely mounted to said wheel, a third chain drive sprocket attached to said friction drive mechanism and a second continuous link chain mounted on said third chain drive sprocket and said sprocket wheel.

20. A wheelbarrow as defined in claim 19 wherein said third chain drive sprocket is mounted on the outside surface of one of the drive plates.

21. A wheelbarrow as defined in claim 13 wherein said means for maintaining said handles securely in place with respect to one another comprises a brace which also shields said engine from debris.

22. A wheelbarrow as defined in claim 21 further comprising a removable mud flap attached to said brace and extending over said engine and away from said wheel.

23. A wheelbarrow as defined in claim 13 further comprising a removable canopy disposed over said engine and between said handles to shield said engine from debris.

24. A wheelbarrow as defined in claim 13 comprising a skid plate attached to said legs of said frame and subtending said engine to shield said engine from debris.

25. A wheelbarrow as defined in claim 13 further comprising a leg extender for attachment to said leg of said frame.

26. A motorized wheelbarrow comprising:
   a frame comprised of a pair of handles, each handle having a leg securely attached thereto, positioned so as to aid in supporting said wheelbarrow, a means for maintaining said handles securely in place with respect to one another, a mounting means attached to said handles and said legs for holding an engine and a friction transmission mechanism;
   a wheel mounted on said frame by a connecting means such that said wheel is in position to bear the load of the frame and its cargo when the handles are lifted;
   an engine mounted on said frame;
   a friction transmission mechanism mounted on said frame such that the power produced by said engine is capable of being transmitted to said drive wheel, said friction transmission mechanism comprising a drive shaft which is capable of being turned by said engine, a first chain drive attached to said drive shaft, a second chain drive attached to a friction drive mechanism and a first continuous link chain mounted on said first and second chain drives, a sprocket wheel securely mounted to the side of said wheel, a third chain drive attached to said friction drive mechanism and a second continuous link chain mounted on said third chain drive and said sprocket wheel, said friction drive mechanism comprising a friction wheel securely attached to said second chain drive such that it will rotate in a generally horizontal plane and disposed between a pair of drive plates which rotate in a generally vertical plane, wherein a control means for operating said clutch is capable of moving said friction wheel such that it can engage and turn either drive plate, a means of connecting said drive plates together such that a predetermined space is maintained between said drive plates within which said friction wheel can rotate; said third chain drive being mounted on the outside surface of one of the drive plates;

a bed capable of carrying cargo together with vertical and horizontal supports attached to said bed and which support said bed on said frame; and control means for operating said friction drive mechanism.

27. A wheelbarrow as defined in claim 26 wherein said bed is pivotably attached to said frame by a pair of bolts which connect said bed to said frame above the point where said wheel is mounted to said frame.

28. A wheelbarrow as defined in claim 27 wherein said bed is mounted on said frame such that said bed can pivot upwardly around said bolts.

29. A wheelbarrow as defined in claim 29 wherein said bed may be removed from said frame by removing said bolts and lifting said bed off of said frame, and wherein a different bed may be attached to said frame.

30. A wheelbarrow as defined in claim 29 wherein said bed comprises a bucket.

31. A wheelbarrow as defined in claim 27 wherein said bed is generally flat.

32. A wheelbarrow as defined in claim 27 wherein said bed comprises a stretcher and an additional pair of handles extending in a forward direction with respect to said wheel.

33. A wheelbarrow as defined in claim 32 wherein said bed further comprises a backstop attached to the end of said bed proximate to the wheel; said backstop for stabilizing the cargo during movement of the wheelbarrow.

34. A wheelbarrow as defined in claim 30 wherein said frame is made of steel tubing, strips and angle pieces.

35. A wheelbarrow as defined in claim 27 wherein at least one additional wheel is mounted to the frame such that said wheelbarrow is supported by said wheels.

36. A wheelbarrow as defined in claim 27 further comprising a dumping bar swingably attached to the rear of said bed.

37. A wheelbarrow as defined in claim 27 wherein said means for maintaining said handles securely in place with respect to one another comprises a brace which also shields said engine from debris.

38. A wheelbarrow as defined in claim 27 further comprising a removable mud flap attached to said brace and extending over said engine and away from said wheel.

* * * * *